(No Model.)

E. S. McCLELLAN.
TRAP FOR BATHS, BASINS, &c.

No. 334,129. Patented Jan. 12, 1886.

Witnesses
Chas H. Smith
J. Staib

Inventor
Ezra S. McClellan
by Lemuel W. Serrell
Atty

UNITED STATES PATENT OFFICE.

EZRA S. McCLELLAN, OF PATERSON, NEW JERSEY.

TRAP FOR BATHS, BASINS, &c.

SPECIFICATION forming part of Letters Patent No. 334,129, dated January 12 1886.

Application filed April 13, 1885. Serial No. 162,029. (No model.)

*To all whom it may concern:*

Be it known that I, EZRA S. MCCLELLAN, of Paterson, in the county of Passaic and State of New Jersey, have invented an Improvement in Traps for Basins, Baths, &c., of which the following is a specification.

In this improved trap I make use of mercury to seal the trap and exclude gases, and said mercury also supports the maximum column of water in the basin or bath, and allows surplus water to pass through the trap, and to this extent the devices correspond to those set forth in my Patent No. 309,395, and in my application No. 154,019, filed January 26, 1885.

My present invention is especially adapted to wash-basins in which the porcelain is extended down below the basin and forms the trap, and to this is connected a mercury-holding vessel containing a displacer, and there is a rod passing through the displacer and extending upwardly and terminating with a handle by which the displacer can be raised to allow the mercury to run back out of the trap and the contents of the basin to discharge. At the lower end of the lifting-rod is a valve, which, as the lifting-rod is dropped, closes the mercury-pipe almost entirely, so that the mercury can only pass back gradually into the trap. This allows the necessary period of time to elapse for the discharge of the contents of the basin before the mercury rises and fills the trap.

Figure 1:
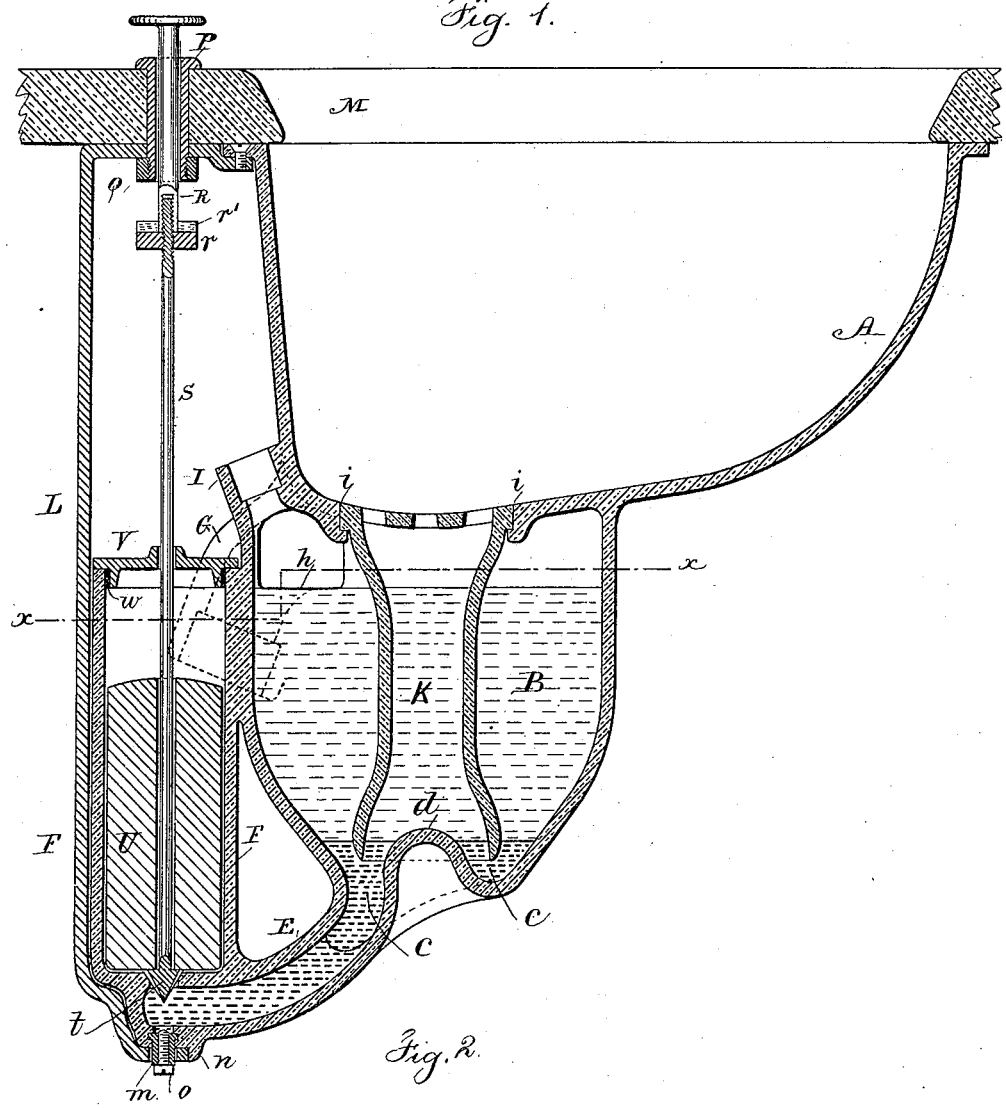
Figure 2:
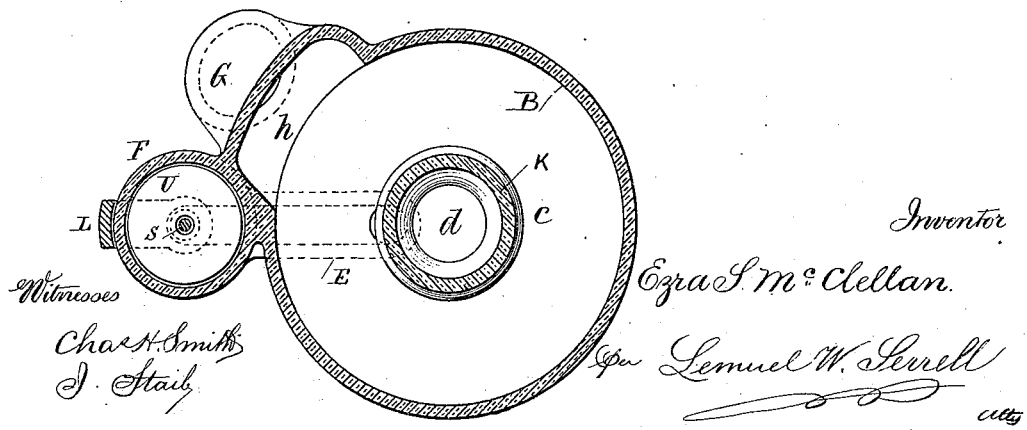

In the drawings, Figure 1 is a vertical section of the basin-trap and mercury-holder, and Fig. 2 is a horizontal section at the line x x.

The basin A is preferably of the shape shown sectionally in Fig. 1, in order that the discharge-pipe may be at the back or at one side adjacent to the handle, that operates the displacer, thereby lessening the length of the tube between the trap and the mercury-holding vessel. The trap is made as a chamber, B, beneath the basin A, and in the bottom of this chamber B is an annular mercury-trough, c, with a central convex or conical projection, d, and from the annular trough c the mercury-pipe E leads to the mercury-holder F, which is in the form of a vertical cylinder. Adjoining the chamber B and at G is a discharge or sewer pipe horn, with an overflow-dam at h, and I also prefer to make use of a ventilating-pipe connected with the horn I. I prefer to make the basin A, chamber B, pipe E, mercury-holder F, and horn G of porcelain or earthenware and all in one piece; but I do not limit myself in this particular, and when these parts are made in porcelain the side of the cylinder F should be connected with the side of the chamber B. The dip-pipe K extends down from the bottom of the base A, and its lower end is centrally above the mercury-trough c. I prefer to make this dip-pipe of porcelain, with a strainer at the upper end and a flange by which the dip-pipe is hung from the bottom of the basin, the parts being united and rendered water-tight by a rubber ring or cement at the joint i. The strainer at the top of the dip-pipe may be of porcelain, or it may be an ordinary metal strainer. The dip-pipe is flaring to increase the space for the discharge beneath its lower end. I prefer to make use of a supporting-frame, L, passing down from the under side of the slab M to the lug n at the lower part of the mercury-pipe E, and in line with the center of the mercury-holder F. At this place said mercury-pipe E should be perforated for the reception of a plug, m, and screw o, the former being securely fastened into the porcelain by melted sulphur or other cementing material. This screw o allows the mercury to be drawn out when necessary. The upper part of the frame L is formed as a flange to rest against the under side of the slab M, and such flange is made with an offset to pass beneath the top flange of the basin A, and by means of screws passing through countersunk holes in the porcelain flange the frame L is connected to the basin and held in place to facilitate transportation, and to become a guide in properly placing and connecting the basin to the slab. Said slab M is to be perforated for the passage of the connecting-thimble P, which passes through such slab, and also through the top part of the frame L; and Q is a tubular clamping-nut for securing the thimble and frame to the slab. Through this thimble P the handle R passes, and is secured to the upper end of the rod S, and at the lower end of this rod S is a valve, t, resting into a seat at the junction of the mercury-pipe E with the holder F. This valve is not ground tightly to its seat, or else there is a small channel through the seat for allowing the gradual passage of the mercury. U is a displacer within the mercury-holder F, which displacer will be of iron, and having a hole through it for the free passage of the rod S. There is a cap or cover, V, to the mercury-holder F, which may be of porcelain or other suitable material, and this cover may be held in place by a rubber band at $w$. Upon the rod S, at its junction with the handle R, is a lock-nut, $r$, and above it a rubber cushion or washer, $r'$, to limit the upward movement of the rod S and displacer U by contact with the lower end of the tubular nut Q. Mercury is to be supplied into the trap until it rises above the lower end of the dip-pipe K, and the height of the mercury above said lower end must be in proportion to the column of water to be sustained in the basin. Water will remain in the chamber B up to the dam $h$. When the handle R is raised the displacer U is lifted and the mercury rushes out of the annular trough $c$ by the pipe E into the holder F, and the contents of the basin A are free to discharge by the sewer-pipe connected with the horn G. When the handle R is dropped, the valve $t$ immediately fills the opening to the mercury-tube E, and the displacer U floats in the mercury, and, as the mercury passes gradually through between the valve and its seat, the displacer descends, and this operation continues until the mercury resumes its normal level position; and it will be apparent that the time consumed in this operation will depend upon the amount of leakage between the valve and its seat. This leakage is to be such that sufficient time will be allowed for the discharge of the contents of the basin A should the handle R be dropped immediately after being lifted.

I claim as my invention—

1. The combination, with the basin, of a chamber, B, having an annular mercury-holding trough, a separate mercury-holder, a displacer within the mercury-holder and a rod for lifting the displacer, and a tube connecting the mercury-holding trough to the mercury-holding vessel, whereby the mercury will be allowed to run from the annular trough into the mercury-holding vessel and the contents of the basin to discharge, substantially as set forth.

2. The combination, with the chamber B and dip-pipe K, of a tube, E, and mercury-holder F, connected with the lower end of such chamber B, a displacer in the mercury-holder, a rod for raising the same, and a valve at the lower end of the rod for nearly closing the discharge-opening between the mercury-holder and the pipe leading to the chamber, substantially as set forth.

3. The combination, with the chamber B, having an annular mercury-trough in the bottom, the mercury-holder F, and connecting-tube E, of the dip-pipe K, extending down into the chamber B, and terminating above the bottom of the annular mercury-trough at the bottom of said chamber B, substantially as set forth.

4. The mercury-holder F, displacer U, valve and rod S, in combination with the handle R, lock-nut $r$, and cushion $r'$, substantially as set forth.

5. The frame L, connected at its lower end with the porcelain at the bottom of the mercury-holder, and having at its upper end a flange connected with the basin, in combination with the thimble P, tubular nut Q, for connecting the frame to the slab, the handle R, passing through the thimble, the rod S, displacer U, mercury-holder F, and trap, substantially as set forth.

6. The combination, with a trap containing mercury, of a vessel for holding mercury, a pipe connecting the trap to the vessel, and a valve in the said mercury-pipe to open and allow the mercury to run rapidly out of the trap and to nearly close and allow the gradual return of the mercury into the trap, substantially as set forth.

7. The combination, with the basin or vessel holding water, of a trap containing mercury, a mercury-holding vessel, and a pipe connecting the same to the trap, a displacer within the mercury-holding vessel, and a valve in said pipe to regulate the gradual return of mercury to the trap, substantially as specified.

8. The basin or vessel for holding water, a discharge-pipe, and a trap containing mercury, in combination with a mercury-holding vessel, with an opening to connect the same to the trap to allow the rapid subsidence of the mercury for opening the seal, and a contracted opening for allowing the gradual return of the same for insuring the required time for the discharge of the water from the basin or bowl, substantially as specified.

Signed by me this 6th day of April, A. D. 1885.

EZRA S. McCLELLAN.

Witnesses:
GEO. T. PINCKNEY,
WILLIAM G. MOTT.